United States Patent
Minami et al.

(10) Patent No.: US 10,952,414 B2
(45) Date of Patent: Mar. 23, 2021

(54) AQUACULTURE SYSTEM

(71) Applicant: Nippon Suisan Kaisha, Ltd., Tokyo (JP)

(72) Inventors: Hiroshi Minami, Saiki (JP); Mitsuho Maeda, Saiki (JP); Eisuke Yasue, Saiki (JP); Kosuke Matsuoka, Saiki (JP)

(73) Assignee: Nippon Suisan Kaisha, Ltd., Tokyo (JP)

(*) Notice: Subject to any disclaimer, the term of this patent is extended or adjusted under 35 U.S.C. 154(b) by 0 days.

(21) Appl. No.: 16/542,572

(22) Filed: Aug. 16, 2019

(65) Prior Publication Data

US 2019/0364857 A1 Dec. 5, 2019

Related U.S. Application Data (63) Continuation of application No. PCT/JP2018/005596, filed on Feb. 16, 2018.

(30) Foreign Application Priority Data

Feb. 17, 2017 (JP) .............................. JP2017-028272

(51) Int. Cl.
*A01K 63/04* (2006.01)
*A01K 63/00* (2017.01)
(Continued)

(52) U.S. Cl.
CPC ............ *A01K 63/065* (2013.01); *A01K 61/59* (2017.01); *A01K 61/85* (2017.01); *A01K 63/042* (2013.01)

(58) Field of Classification Search
CPC ...... A01K 63/04; A01K 61/10; A01K 63/065; A01K 63/00; A01K 61/85; A01K 61/59;
(Continued)

(56) References Cited

U.S. PATENT DOCUMENTS 5,046,451 A * 9/1991 Inslee .................... A01G 31/02
119/227
5,216,976 A 6/1993 Marinkovich
(Continued)

FOREIGN PATENT DOCUMENTS

CA    2382643 A1 * 4/2001 ............. A01K 63/04
CN    105379650 A    3/2016
(Continued)

OTHER PUBLICATIONS

International Preliminary Report on Patentability and Written Opinion dated Aug. 20, 2019, in PCT/JP2018/005596, citing documents AR and AX therein, 6 pages.
(Continued)

*Primary Examiner* — Yvonne R Abbott-Lewis
(74) *Attorney, Agent, or Firm* — Oblon, McClelland, Maier & Neustadt, L.L.P.

(57) ABSTRACT

An aquaculture system including an aquaculture tank for holding aquaculture water for culturing an aquatic organism, a thermal insulation house that covers the aquaculture tank, an insulation positioned on at least part of a region surrounding the aquaculture tank, and a temperature adjuster that adjusts a temperature inside the thermal insulation house and/or a temperature of the aquaculture water in the aquaculture tank.

21 Claims, 9 Drawing Sheets

(51) Int. Cl.
  *A01K 61/00* (2017.01)
  *A01K 61/85* (2017.01)
  *A01K 63/06* (2006.01)
  *A01K 61/59* (2017.01)

(58) Field of Classification Search
  CPC ... A01K 63/042; A01K 63/003; A01K 63/006
  USPC .................. 119/227, 200, 212, 215, 207
  See application file for complete search history.

(56) References Cited

U.S. PATENT DOCUMENTS

| | | | | |
|---|---|---|---|---|
| 5,839,391 | A * | 11/1998 | Shaar .................... | A01K 61/59 119/212 |
| 5,979,362 | A * | 11/1999 | McRobert ............. | A01K 63/00 119/227 |
| 6,293,228 | B1 * | 9/2001 | Woytowitz, Jr. ........ | A01K 1/00 119/452 |
| 2004/0144328 | A1 * | 7/2004 | Bonner ................... | A01K 1/03 119/455 |
| 2008/0028667 | A1 * | 2/2008 | Grzybowski ......... | A01K 63/02 43/57 |
| 2009/0050067 | A1 * | 2/2009 | Parsons ................. | G06Q 99/00 119/200 |
| 2013/0121766 | A1 * | 5/2013 | Birger ..................... | B63B 22/18 405/52 |
| 2017/0325427 | A1 * | 11/2017 | Straight ................. | A01G 31/06 |
| 2019/0045756 | A1 * | 2/2019 | Liu .......................... | C02F 3/325 |
| 2019/0254244 | A1 * | 8/2019 | Brion ..................... | A01K 63/04 |
| 2019/0364856 | A1 * | 12/2019 | Minami ................. | A01K 63/04 |

FOREIGN PATENT DOCUMENTS

| | | | | |
|---|---|---|---|---|
| CN | 105766748 | A | 7/2016 | |
| GB | 2518217 | A | 3/2015 | |
| JP | 55-41078 | U | 3/1980 | |
| JP | 58-12609 | Y2 | 3/1983 | |
| JP | 3022030 | U | 3/1996 | |
| JP | 2013-255449 | A | 12/2013 | |
| KR | 2018080526 | A * | 7/2018 | ............ A01K 63/04 |
| WO | WO 2016/108523 | A2 | 7/2016 | |
| WO | WO 2016/160141 | A1 | 10/2016 | |

OTHER PUBLICATIONS

Hargreaves, J. A., "Biofloc Production Systems for Aquaculture", SRAC Publications, No. 4503, Apr. 2013, 12 pages.
Extended Search Report dated Nov. 12, 2020 in European Patent Application No. 18754298.0.

* cited by examiner

AQUACULTURE SYSTEM

CROSS-REFERENCE TO RELATED APPLICATIONS

The present application is a continuation of International patent application PCT/JP2018/005596, filed on Feb. 16, 2018, which is based on and claims the benefits of priority to Japanese Application No. 2017-028272, filed on Feb. 17, 2017. The entire contents of these applications are incorporated herein by reference.

BACKGROUND OF THE INVENTION

Field of the Invention

The present invention relates to an aquaculture system for rearing fish and shellfish, crustaceans, and the like on land, and particularly to an aquaculture system suitable for rearing whiteleg shrimps.

Discussion of the Background

Various kinds of equipment and devices have been developed for aquaculture systems in which fish and shellfish, crustaceans, and the like are reared in an aquaculture tank built on land, and "aquaculture equipment for aquatic products" described in Patent Literature 1, for example, is related to the present application.

This "aquaculture equipment for aquatic products" includes an endless annular circulation-type tank; a water management device configured to take out aquaculture water inside the tank to the outside of the tank, adjust the taken-out aquaculture water to a prescribed state, and then return the aquaculture water into the tank; an aeration water passage for aerating treated water delivered from the water management device; a flow generation device configured to generate a circulating water flow in a set direction; a feeder, and the like.

Patent Literature 1: JP 3022030 U

SUMMARY OF THE INVENTION

According to an aspect of the present invention, an aquaculture system includes an aquaculture tank for holding aquaculture water for culturing an aquatic organism, a thermal insulation house that covers the aquaculture tank, an insulation positioned on at least part of a region surrounding the aquaculture tank, and a temperature adjuster that adjusts a temperature inside the thermal insulation house and/or a temperature of the aquaculture water in the aquaculture tank.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

The embodiments will now be described with reference to the accompanying drawings, wherein like reference numerals designate corresponding or identical elements throughout the various drawings.

Hereinafter, an aquaculture system 100 as an embodiment of the present invention will be described with reference to FIGS. 1 to 9. As illustrated in FIGS. 1 to 3B and FIG. 7, the aquaculture system 100 of the present embodiment includes a thermal insulation house 10 constructed on the ground G, an aquaculture tank 50 formed in the thermal insulation house 10, and a boiler 30, which is a heating unit to heat aquaculture water W in the aquaculture tank 50. A fuel tank 31 to store fuel for use in the boiler 30 is disposed in the vicinity of the boiler 30.

The thermal insulation house in the present application is a construction for maintaining the temperature of an aquaculture tank facility within a prescribed range. When the temperature outside the thermal insulation house is lower than a temperature suitable for aquaculture, it is possible to maintain the temperature inside the thermal insulation house at the temperature suitable for aquaculture by isolating the thermal insulation house from the outside air.

On the other hand, when the temperature inside the thermal insulation house is higher than a water temperature suitable for aquaculture, it is possible to introduce the outside air by opening an opening and shutting door, a ventilation opening, or the like of the thermal insulation house, and bring the temperature inside the thermal insulation house to the temperature suitable for aquaculture. By installing the aquaculture tank inside the thermal insulation house, the load of heating and cooling is decreased, thereby making it possible to suppress energy costs.

In the present embodiment, the thermal insulation house 10 is a facility for maintaining the water temperature in the aquaculture tank 50 inside the thermal insulation house 10 within a prescribed range. The internal humidity of the thermal insulation house 10 is maintained at from 80% to 100%. As the humidity increases within a closed space, loss of the aquaculture water W due to evaporation is suppressed; therefore, it is particularly favorable to a land aquaculture system, like the aquaculture system 100, that does not exchange the aquaculture water W as much as possible.

When the temperature outside the thermal insulation house 10 is lower than the water temperature inside the aquaculture tank 50, it is possible to maintain the temperature inside the thermal insulation house 10 at a temperature close to the water temperature suitable for aquaculture by isolating the thermal insulation house 10 from the outside air. In addition, it is also possible to perform cooling and heating by a temperature adjustment unit.

On the other hand, when the temperature inside the thermal insulation house 10 is higher than the water temperature in the aquaculture tank 50, it is possible to introduce the outside air by opening a sliding door 14, a ventilation opening 16, or the like provided in the thermal insulation house 10 (see FIG. 4), and bring the temperature inside the thermal insulation house 10 to the water temperature suitable for aquaculture. In addition, it is also possible to perform heating and cooling by the temperature adjustment unit.

Figure 7:
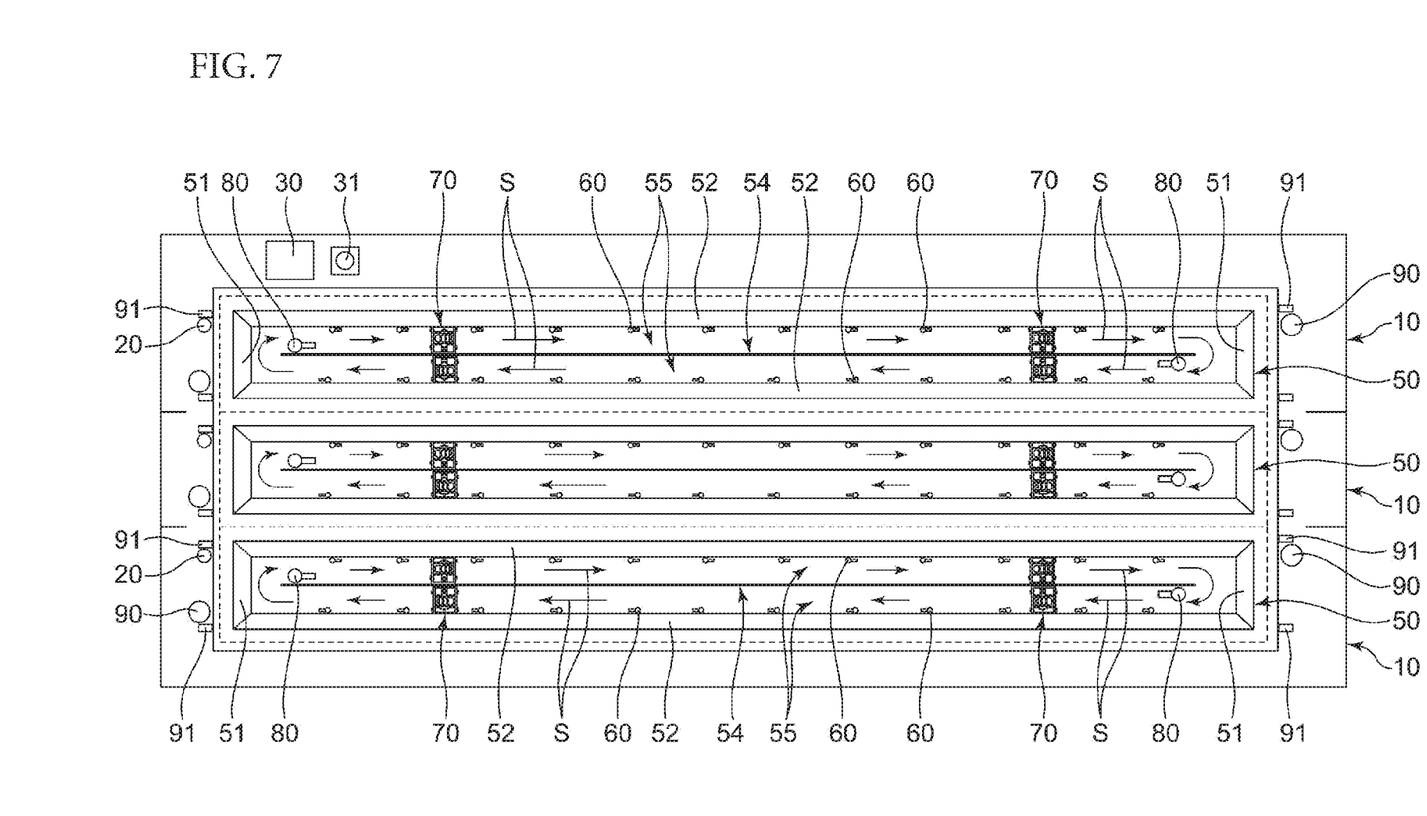
FIG. 7 is a partially omitted plan view illustrating an aquaculture tank constituting the aquaculture system illustrated in FIG. 1.

In the present embodiment, three thermal insulation houses 10 have a multi-span structure, and three aquaculture tanks 50, 50, and 50 are respectively formed in portion on the ground G covered by the three thermal insulation houses 10, 10, and 10 (see FIG. 7). Since the size of the thermal insulation house 10, the number of houses in the multi-span structure, and the like are not limited, it is possible to determine them in accordance with an area size, circumstances, and the like of the construction site.

Figure 1:
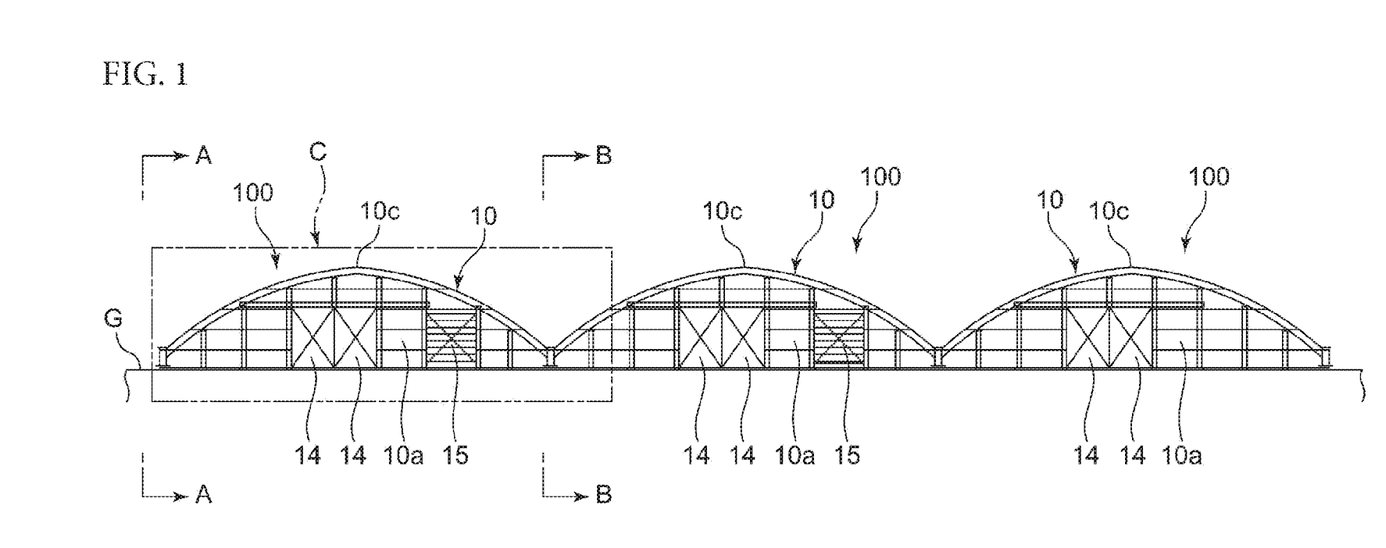
FIG. 1 is a front view illustrating an aquaculture system as an embodiment of the present invention.
Figure 2:
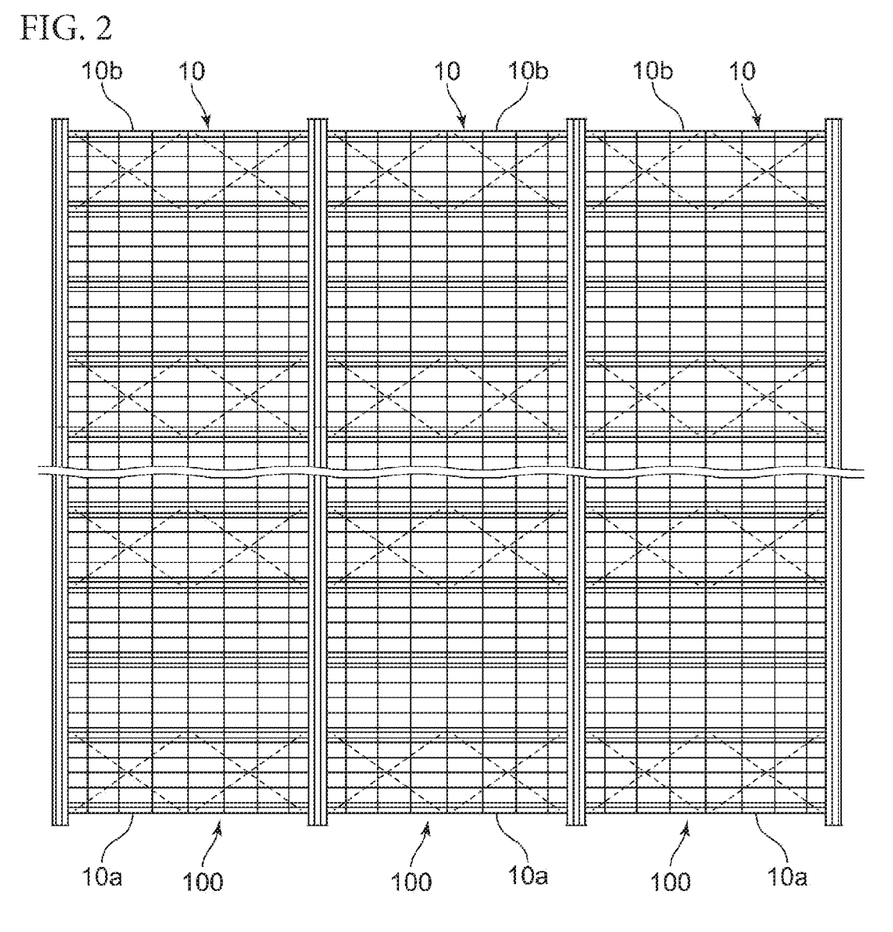
FIG. 2 is a partially omitted plan view of the aquaculture system illustrated in FIG. 1.
Figure 3A:
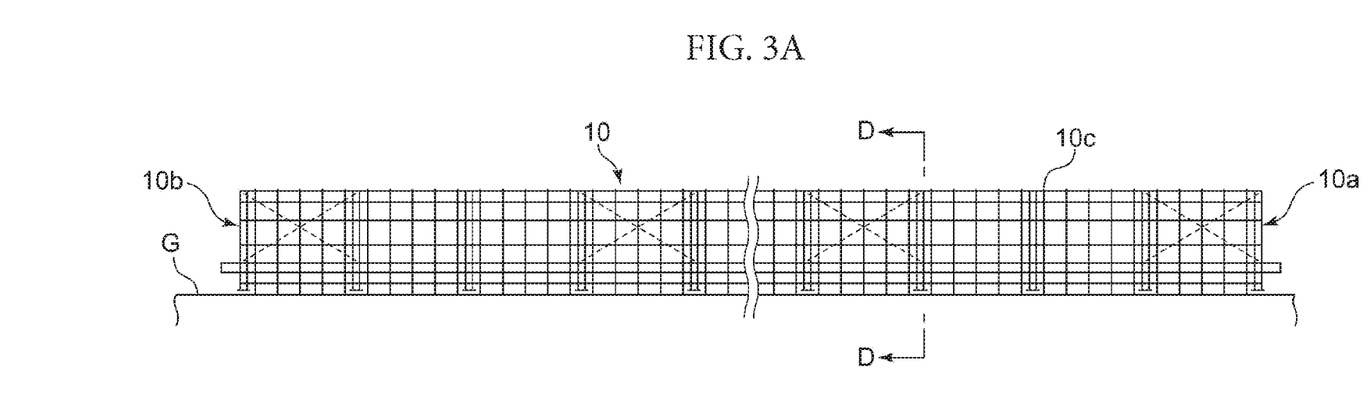
FIG. 3A is a partially omitted side view taken along a line A-A in FIG. 1.
Figure 3B:
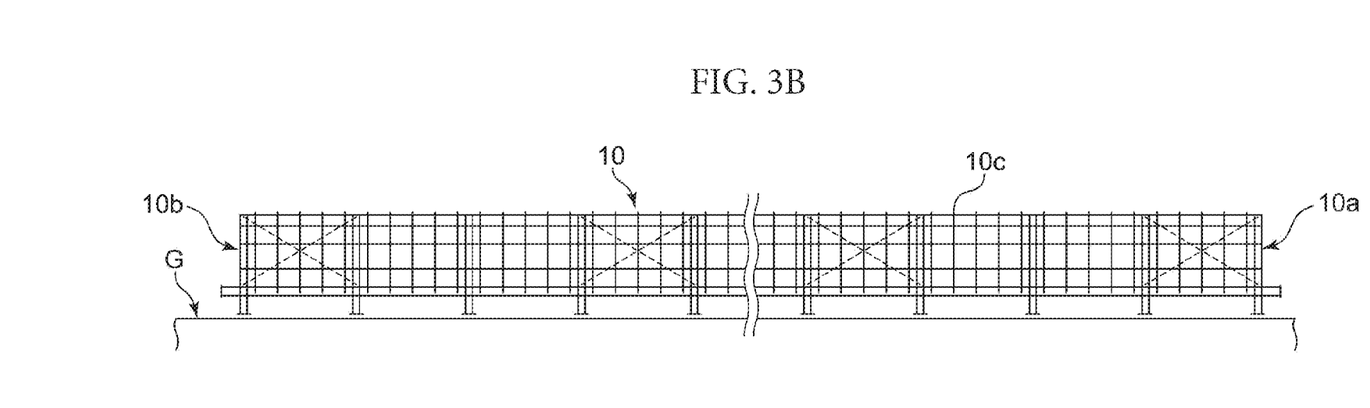
FIG. 3B is a partially omitted side view taken along a line B-B in FIG. 1.
Figure 4:
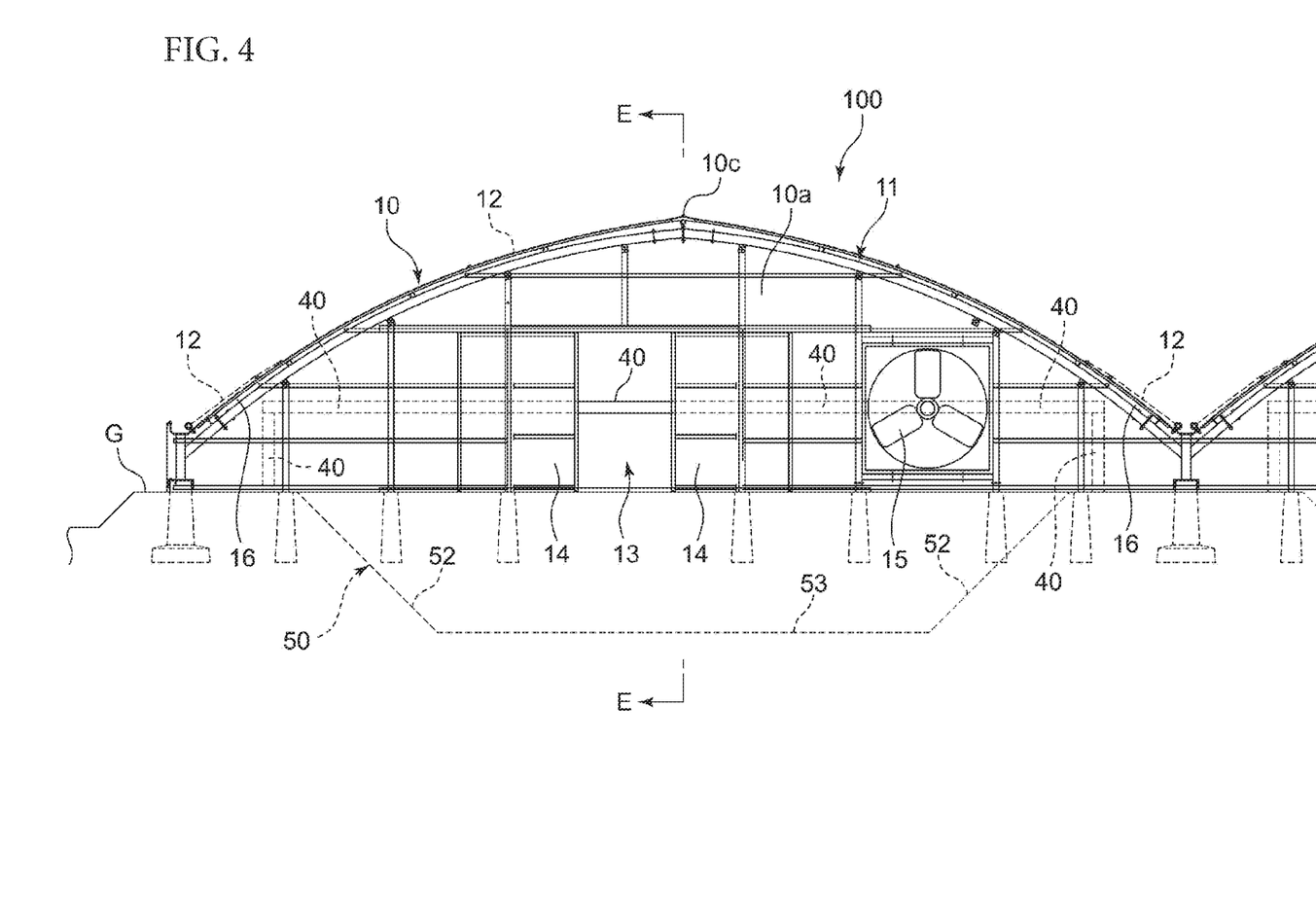
FIG. 4 is a partially omitted enlarged view of a region indicated by an arrow line C in FIG. 1.
Figure 5:
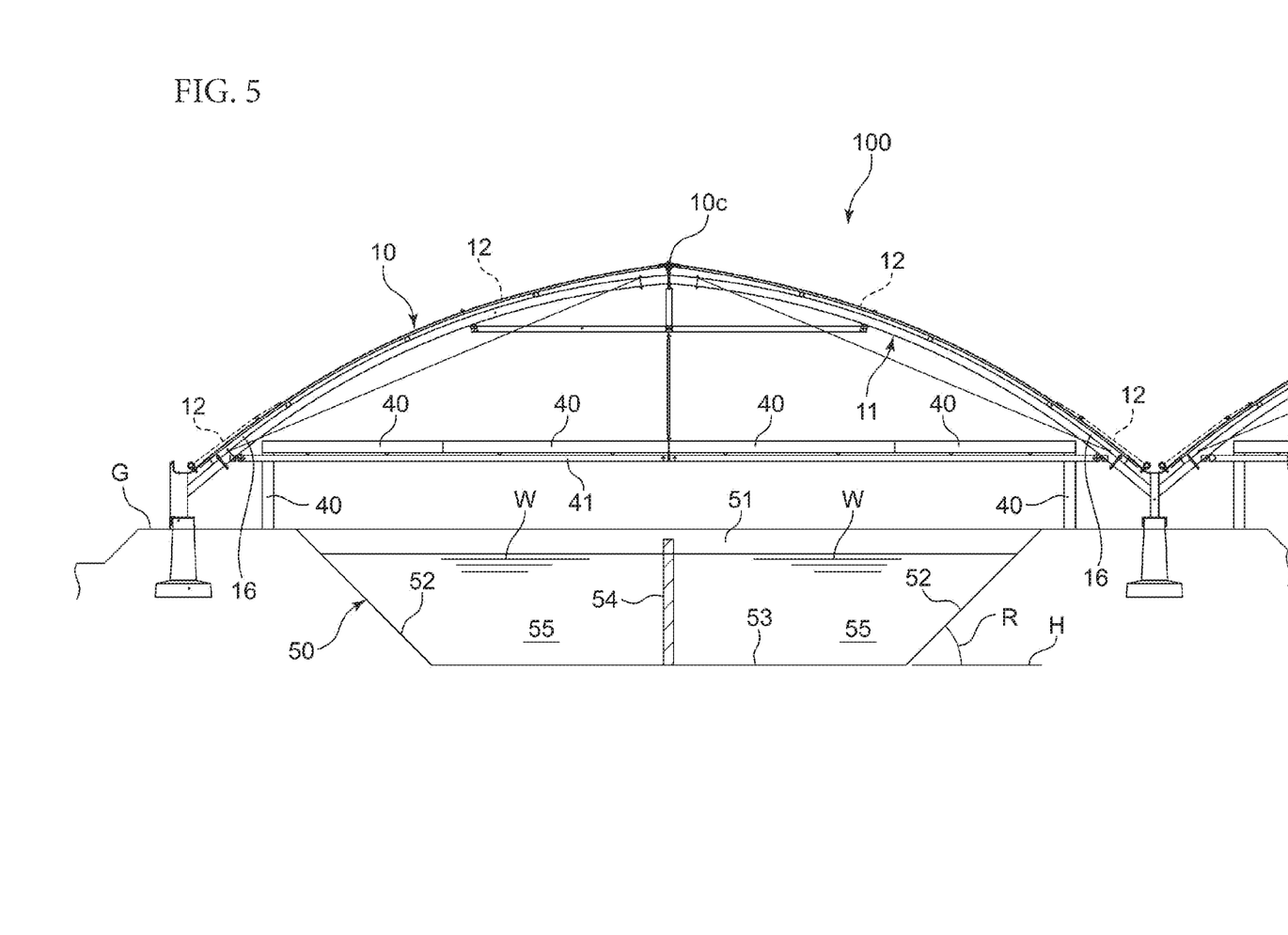
FIG. 5 is a partially omitted cross-sectional view taken along a line D-D in FIG. 3A.
Figure 6:
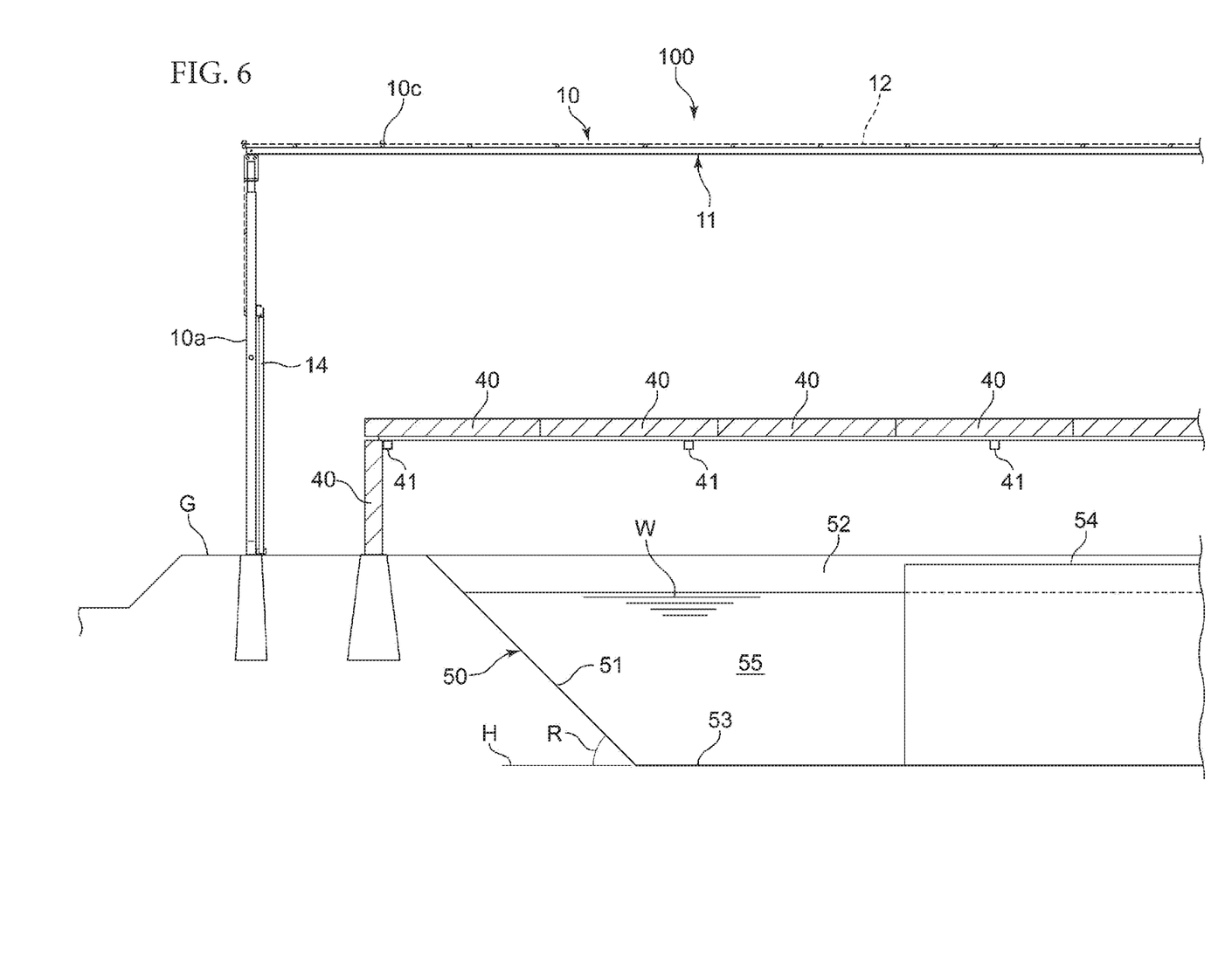
FIG. 6 is a partially omitted cross-sectional view taken along a line E-E in FIG. 4.

As illustrated in FIGS. 4 to 6, the thermal insulation house 10 is constructed in the following manner: a semi-cylindrical building 11 is formed by combining a plurality of pipe members, a plurality of angle members, and the like; and then a synthetic resin film member 12 covers the circumference of the building 11. As illustrated in FIG. 4, a front surface portion 10a of the thermal insulation house 10 is provided with a doorway 13 and a pair of sliding doors 14, 14 movable right and left to open and close the doorway 13. A ventilation fan 15 is disposed in the vicinity of one of the sliding doors 14. The height from the ground G to a top portion 10c of the thermal insulation house 10 is about 2-3 m, but is not limited thereto.

As described above, these sliding doors 14 and 14 are opened when the temperature inside the thermal insulation house 10 rises, so as to be used as a ventilation pathway. In addition to the sliding door 14, an opening and shutting door, a ventilation opening, or the like may be provided to be used as a ventilation pathway.

In the eaves portion of the roof of the thermal insulation house 10, the ventilation opening 16 able to be opened or closed by rolling up the synthetic resin film member 12 toward the top portion 10c or rolling it down therefrom. A rear surface portion 10b of the thermal insulation house 10 is in a state of being occluded by the synthetic resin film member 12.

As illustrated in FIGS. 4 to 7, any of the three aquaculture tanks 50 is formed in a rectangular shape in a plan view, and inner wall surfaces 51, 51 on short-side sides of the rectangular shape as well as inner wall surfaces 52, 52 on long-side sides of the rectangular shape are inclined to form descending slopes toward the interior of the aquaculture tank 50. The shape of a bottom surface 53 of the aquaculture tank 50 is rectangular in a plan view, and is generally horizontal. As illustrated in FIGS. 5 and 6, in the aquaculture tank 50, an inclination angle R of each of the inner wall surfaces 51 and 52 is 45 degrees with respect to a horizontal plane H, but is not limited thereto. For example, when a recessed portion is formed on the ground G to build the aquaculture tank 50, the inclination angle may be adjusted within a range from 40 degrees to 70 degrees as an angle that ensures the strength in the process of digging the ground G.

In the present application, the aquaculture tank refers to equipment configured to accumulate a set amount of water in which aquatic organisms can be reared. In order to rear aquatic organisms in the aquaculture tank, it is preferable to appropriately and continuously measure pH, an amount of dissolved oxygen, ammonia concentration and the like, and adjust them within appropriate ranges. The aquaculture tank may utilize part of the ocean, a river, a lake, or the like, but aquaculture equipment may be artificially installed on land. In particular, in the present application, artificial land equipment in which the temperature of the aquaculture tank can be managed with ease is preferred.

In the aquaculture system 100 of the present embodiment, the aquaculture tank 50 is formed in the following manner: a recessed portion is formed downward from the ground G in the gravitational direction, and then a synthetic resin sheet having a water-shielding property is laid on the inner wall surfaces and the bottom surface of the recessed portion.

As illustrated in FIGS. 4 to 6, the upper surface and the outer peripheral surface of the aquaculture tank 50 are covered with a plurality of plate-like heat insulation materials 40 (for example, foamed synthetic resin members) as a heat insulation unit. Above the aquaculture tank 50, the plurality of heat insulation materials 40 is detachably disposed on a plurality of receiving beams 41 supported in a horizontal state by constituent members of the building 11. The heat insulation material 40 may be any material as long as it has a heat insulating function, and styrene foam is preferred in this case because it is inexpensive and robust. In particular, it is preferable to use a heat resistance styrene foam among the styrene foam.

Furthermore, it is preferable to paste a thermal insulation sheet on part or all of the styrene foam because it is possible to obviate heat dissipation due to radiant heat. As a thermal insulation sheet, for example, Tyvec Silver (available from DuPont) may be used.

A range in which the aquaculture tank 50 is covered with the heat insulation unit is not particularly limited as long as the range brings a situation in which a desired heat insulation effect is exhibited; for example, in a case where the upper side of the water surface of the aquaculture tank 50 is partially covered, since aquaculture work, feeding, and the like can be carried out from the uncovered upper side of the water surface as is while expecting the achievement of the heat insulation effect, it is sufficient to cover a range of at least about one quarter of the upper side of the water surface. In addition, in order to easily observe the state of the water surface while achieving the heat insulation effect, it is also possible to cover a range of at least about one third to one half of the upper side of the water surface.

Furthermore, in order to observe the state of the water surface while expecting the enhancement of the heat insulation effect, it is also possible to cover a range of at least two-thirds to three-quarters of the upper side of the water surface. Moreover, in order to expect the achievement of the maximum heat insulation effect, it is also possible to cover a range of at least about four-fifths of the upper side of the water surface, or to cover the entire upper side of the water surface.

As described above, the heat insulation effect can be achieved by only covering the upper side of the water surface of the aquaculture tank 50 with the heat insulation unit; however, in order to further enhance the heat insulation effect, it is also possible to have a configuration in which portions other than the upper side of the water surface of the aquaculture tank 50, for example, the side surfaces and the bottom surface of the aquaculture tank 50 are surrounded by the heat insulation unit.

The heat insulation material 40 also has a function of blocking light (sunlight) from outside, in addition to having the heat insulating function. As mentioned above, by covering the upper side of the aquaculture tank 50 with the heat insulation material 40, it is possible to maintain the humidity of the closed space near the water surface in the aquaculture tank 50 to be high. When the humidity of the closed space is maintained high, it is possible to prevent the loss of the aquaculture water W due to evaporation. Therefore, it is beneficial for a land aquaculture system, like the aquaculture system 100, that does not exchange the aquaculture water W as much as possible.

Figure 8:
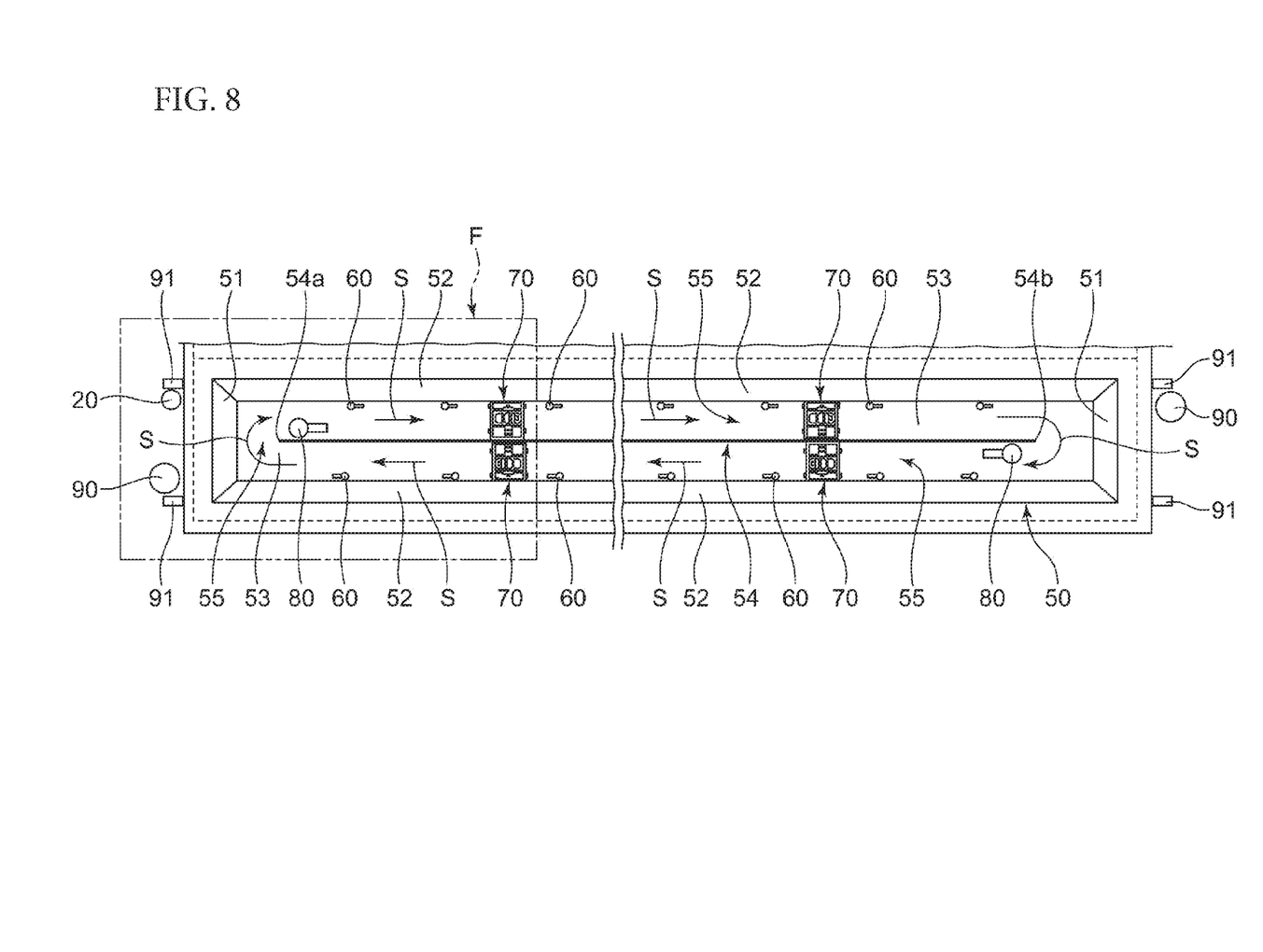
FIG. 8 is a partially omitted enlarged view of the aquaculture tank illustrated in FIG. 7.
Figure 9:
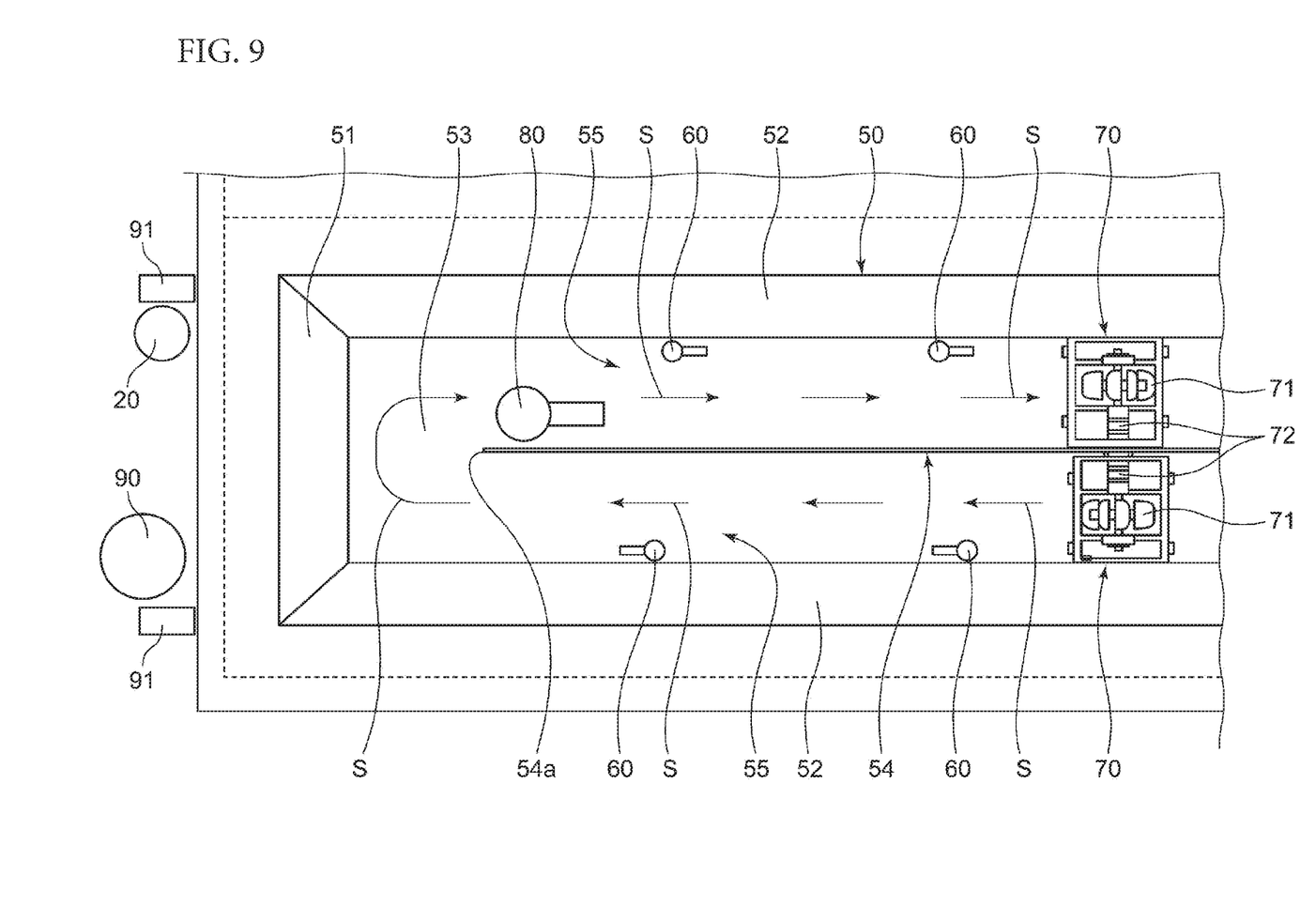
FIG. 9 is a partially omitted enlarged view of a region indicated by an arrow line F in FIG. 8.

As illustrated in FIGS. 7 to 9, in each of the aquaculture tanks 50, a tabular partition wall 54 is vertically provided in a region which is distanced from the four inner wall surfaces 51, 51, 52, and 52 toward the inner side of the aquaculture tank 50, and in which end portions 54a and 54b in the horizontal direction of the partition wall 54 are located, whereby an endless stream passage 55 is formed in which the aquaculture water W is able to circulate while flowing in the horizontal direction around the partition wall 54.

A ratio of the endless stream passage 55 formed in the aquaculture tank 50 to the aquaculture tank 50 may take any value as long as the passage makes the interior of the aquaculture tank 50 uniform and makes it easy to adjust the temperature; however, it is preferable that the endless stream passage 55 be formed in a range of at least about one quarter of the whole water surface of the aquaculture tank 50 because the supplied feed can be effectively given to the marine organisms. Further, in the case where the endless stream passage 55 is formed in a range of at least about one third to one half of the whole water surface, it is possible to sufficiently disperse and feed the marine organisms during the feeding. In the case where the passage is formed in a range of at least two-thirds to four-fifths, it is possible for the marine organisms to be present in the aquaculture tank 50 while maintaining sufficient spaces therebetween. Since the aquaculture water in the aquaculture tank 50 contains organic substances, the aquaculture water may decay when it stagnates; as such, in order to prevent the decay, it is also possible to form the endless stream passage 55 across the whole water surface.

It is sufficient for the partition wall 54 to be vertically provided such that a water flow is formed therearound; however, in a case where a ratio of the widths of two endless stream passages 55 partitioned in parallel by the partition wall 54 is approximately 1:4 to 4:1, 1:3 to 3:1, or 1:2 to 2:1, a fast water flow portion and a slow water flow portion are formed within the endless stream passages 55, so that individuals fond of a fast water flow environment may swim in the fast water flow region while individuals fond of a slow water flow environment may swim in the slow water flow region.

On the other hand, in order that the overall endless stream passage 50 makes it possible to perform aquaculture in the same environment, it is also possible to vertically provide the partition wall 54 such that the ratio of the widths of the two endless stream passages 55 partitioned in parallel by the partition wall 54 is 1:1.

On the bottom surface 53 of the aquaculture tank 50, a plurality of air injectors 60 is disposed along a longitudinal direction of the endless stream passage 55. Pairs of paddlewheels 70 and 70 are each disposed on a portion near an end portion in the longitudinal direction of the aquaculture tank 50 with the partition wall 54 interposed therebetween. In addition, each of aeration devices 80 is disposed near the end portion in the longitudinal direction of the aquaculture tank 50. Furthermore, each of settling tanks 90 and each of circulation pumps 91 are disposed at the outside of each short-side portion of the aquaculture tank 50. An automatic feeder 20 and the circulation pump 91 are disposed at the outside of one short-side portion of the aquaculture tank 50.

As illustrated in FIG. 9, the paddlewheel 70 includes a rotation blade 71 rotatable about a horizontal shaft and a motor 72 for driving the rotation blade 71. The rotational direction of the rotation blade 71 can be switched. When the rotation blade 71 of the paddlewheel 70 is operated in a manner in which the rotational direction of the rotation blade 71 is set to a normal one (a direction in which a water-landing side of the rotation blade 71 is rotated against a water flow S indicated by an arrow line in FIG. 9), a gas-liquid contact efficiency is normally increased by raising the aquaculture water W from the water surface with the rotation blade 71 of the paddlewheel 70 and dropping the raised aquaculture water W onto the water surface, thereby making it possible to achieve an effect of dissolving oxygen in the aquaculture water W.

The paddlewheel 70 may be used for the purpose described above; however, in a case where the rotation blade 71 is rotated in a rotational direction opposite to the normal rotational direction (a direction in which the water-landing side of the rotation blade 71 is rotated along the water flow S indicated by the arrow line in FIG. 9), a water flow can be generated because the aquaculture water W is pushed by the rotation blade 71 of the paddlewheel 70. As for an area of the rotation blade 71, by increasing the blade area of the portion to enter the water, it is possible to increase resistance of the water and make the water flow to be generated larger. The blade area may be appropriately determined based on a relationship between the resistance with respect to the water and the power used.

In the present embodiment, by counter-rotating the rotation blade 71, it is possible to generate an effective water flow in the aquaculture tank 50 by pushing the aquaculture water W, not pulling up the aquaculture water W. The rotating speed of the rotation blade 71 can be adjusted without using an inverter (not illustrated). The generation of the water flow by using the above-discussed paddlewheel 70 is helpful in a case where a sufficient water flow required for the rearing cannot be obtained only by the air injectors 60. Further, since the attachment posture of the rotation blade 71 of the paddlewheel 70 is changeable by turning over the rotation blade 71, it is also possible to change the attachment posture by turning over the rotation blade 71 so that the surface on the opposite side to the normally-used surface of the rotation blade 71 lands first on the water. The "attachment posture" refers to an attachment state of the rotation blade 71, which is rotatable about the horizontal shaft, with respect to the horizontal shaft. In the present embodiment, when the "attachment posture" of the rotation blade 71 to rotate in a set direction is determined, which of the front and rear surfaces of the rotation blade 71 will land on the water first is specified. Further, "the attachment posture is changeable by turning over the rotation blade" has the following meaning: as for the rotation blade 71 to rotate in the set direction in a certain attachment posture, in the case where the surface of the rotation blade 71 that lands first on the water is defined as "front surface" and the other surface thereof is defined as "rear surface", the surface that lands first on the water can be switched from the "front surface" to the "rear surface" by changing the attachment posture of the rotation blade 71 from the "certain attachment posture" under the condition of the same rotational direction. Furthermore, the "normally-used surface" refers to the surface that lands first on the water when the rotation blade 71 of the paddlewheel 70 is rotated in the normal rotational direction (see paragraph 0054).

In the aquaculture system 100, the boiler 30 is operated, as necessary, to warm the aquaculture water W in the aquaculture tank 50 inside the thermal insulation house 10, and while appropriately maintaining the temperature of the aquaculture water W, the air injectors 60, the paddlewheels 70, the aeration devices 80, the circulation pumps 91, and the automatic feeder 20 are operated, thereby making it possible to culture whiteleg shrimps and the like in the aquaculture water W within the aquaculture tank 50.

The aquaculture system 100 can be constructed in the manner in which a synthetic resin sheet (for example, a PE protective sheet) is laid on a recessed portion formed on the ground G so as to provide the aquaculture tank 50, and then the thermal insulation house 10 to cover the aquaculture tank 50 is provided. Therefore, the aquaculture tank 50 is less costly than a concrete aquaculture tank of related art. The synthetic resin sheet is not particularly limited as long as it is easily processed and has sufficient durability, and high density polyethylene, low density polyethylene, and a hybrid thereof can be used, for example.

The aquaculture tank 50 is provided below the ground G, and is surrounded by earth and sand having an insulating property; in addition, the upper surface portion of the aquaculture tank 50 is covered with the heat insulation materials 40 and the thermal insulation house, and the heat insulation materials 40 are vertically provided on the ground G on the periphery of the aquaculture tank 50. Therefore, the aquaculture tank 50 is unlikely to be affected by the outside air temperature, and the operation costs can be reduced. Furthermore, in the case where the temperature of the aquaculture tank 50 is sufficiently maintained, the heat insulating materials 40 may be removed from the upper surface portion or the peripheral portion of the aquaculture tank 50, or may cover part thereof.

As illustrated in FIG. 5, the inner wall surfaces 51 and 52 of the aquaculture tank 50 are inclined to form descending slopes toward the inner side (the bottom surface 53) of the aquaculture tank 50, so that the inner wall surfaces 51 and 52 form an obtuse angle with respect to the bottom surface 53. With this, the collecting work of shrimps at the gathering time and the collecting work of sediment are made easy to carry out. The inclination angle of the inner wall surface 51 and 52 of the aquaculture tank 50 is set to approximately 45 degrees with respect to the horizontal plane H, but is not limited thereto; the inclination angle thereof may be set to a high angle of approximately 60 to 70 degrees if the soil under the ground G is clayey.

As for each slope portion of the inner wall surfaces 51 and 52 of the aquaculture tank 50, it is possible to allow the rate of the slope portion among the portion submerged in the aquaculture water W to fall within a range of about one third to one half because the work to be carried out becomes easy by introducing human power, machinery, or the like in the non-slope portion. It is also possible to allow the above-mentioned rate to fall within a range of one half to three-fourths, in order to reduce the aquaculture water in the aquaculture tank 50 and gather the aquatic organisms with ease in the non-slope portion. Further, it is also possible to allow the above rate to fall within a range of three-fourths to four-fifths, in order to carry out the cleaning with ease by gathering dirty things or the like scattered in the aquaculture tank 50 in a narrow region. On the other hand, in order to maximize the thermal insulation effect of the aquaculture tank 50, a range from four-fifths to the entirety of the submerged portion may be inclined.

In the case where the slopes are formed on the inner wall surfaces 51 and 52 of the aquaculture tank 50, it is possible to secure wide contact areas between the water and the inner wall surfaces 51, 52 as compared with a case where no slopes are formed, when the aquaculture water is contained having the same depth in the tank in both the cases. In the present embodiment, since the aquaculture tank 50 is formed in the ground below the ground G where a change in temperature is smaller than that in the outside air, the thermal insulation of the aquaculture tank 50 is improved. As a result, the temperature management of the aquaculture tank 50 becomes easier, and the thermal insulation effect is enhanced by providing the slopes on the inner wall surfaces 51, 52 to widen the contact areas between the inner wall surfaces 51, 52 and the aquaculture water W.

Further, in the aquaculture system 100, by setting the height of the top portion 10c of the thermal insulation house 10 to approximately 2-3 m, increases in size and volume of the outer shape are prevented. As a result, temperature control is relatively easy, and it is also possible to reduce the operating costs of the boiler 30 and the like. In addition, by setting the height of the thermal insulation house 10 to approximately 2-3 m, damage caused by strong winds can be suppressed.

Although the aquaculture system 100 is installed in a warm region in many cases, the warm region is often a region that is frequently damaged by typhoons; as such, it is important to suppress the height of the thermal insulation house 10 from the perspective of suppressing the damage caused by strong winds. In addition, by suppressing the height of the thermal insulation house 10, the size (internal volume) of the equipment itself can be reduced so that energy costs in summer or winter can be suppressed to be low. Since the thermal insulation house 10 is provided with the ventilation fan 15 actuated by an electric motor (not illustrated) and the ventilation opening 16 able to be opened and closed, it is possible to let in and out some air, and the temperature management in the thermal insulation house 10 is effectively performed.

When whiteleg shrimps are cultured in the aquaculture tank 50, since the temperature of the aquaculture water W is required to be maintained relatively high (approximately 28° C.), water transpiration is a troublesome issue. However, since the upper surface of the aquaculture tank 50 is covered with the heat insulation materials 40 and the overall aquaculture tank 50 is disposed inside the thermal insulation house 10, it is possible to suppress dissipation of the aquaculture water W. Further, since the heat insulation materials 40 suppress the change in water temperature of the aquaculture water W in the aquaculture tank 50, the energy costs can be reduced.

As illustrated in FIGS. 7 to 9, by spouting water flows mixed with air from the plurality of air injectors 60 provided on the bottom surface 53 of the aquaculture tank 50, it is possible to generate the water flow S that circulates in such a manner as to continuously flow around the partition wall 54 in the aquaculture water W within the aquaculture tank 50 as indicated by the arrow lines in each drawing. Because of this, the aquaculture tank 50 is suitable for culturing whiteleg shrimps having a nature of swimming along the water flow S.

In the aquaculture tank 50, oxygen in the air can be efficiently supplied into the aquaculture water W by operating the aeration devices 80 and the plurality of paddle-wheels 70. Since the rotational direction of the rotation blade 71 of the paddlewheel 70 can be changed, it is possible to rotate the rotation blade 71 in an appropriate direction in accordance with a situation such as the direction of the circulating water flow. Further, since the attachment posture of the rotation blade 71 of the paddlewheel 70 is changeable by turning over the rotation blade 71, it is also possible to change the attachment posture so that the surface to land first on the water is switched by the rotation blade 71 being reversed. When the rotation blade 71 of the paddlewheel 70 is rotated in the normal direction, the speed of the water flow S does not increase; however, when the rotation blade 71 is rotated in a direction opposite to the normal direction, or the surface of the rotation blade 71 normally used for splashing the aquaculture water W to provide oxygen is switched to the other surface by reversing the blade surfaces, the rotation blade 71 comes to push the aquaculture water W so that the flow becomes faster.

In the present application, "biofloc" refers to a cluster of microorganisms artificially created in the water of an aquaculture tank for fish and shellfish, crustaceans, and the like. The biofloc makes it possible to reduce poisonous ammonia, nitrous acid and the like increased due to feeding, and the biofloc itself can also be fed as a source of protein. Since not only fish and shellfish, crustaceans and the like, but also the biofloc depends on the temperature, the aquaculture system according to an embodiment of the present invention able to easily stabilize the temperature is also useful in the aquaculture using the biofloc.

"Macrurans" as the subject of the aquaculture in the aquaculture system of the present application are not limited in size, and include those generally called a lobster, prawn, and shrimp in food classification.

In the academic classification, as a shrimp to be the subject of the present application, the order Decapoda is preferred, and the superfamily Penaeoidea is preferred in the order Decapoda. In the superfamily Penaeoidea, the family Penaeidae is preferred. Organisms of the family Penaeidae include shrimps belonging to the genus of *Farfantepenaeus, Fenneropenaeus, Litopenaeus, Marsupenaeus, Melicertus, Metapenaeopsis, Metapenaeus, Penaeus, Trachypenaeus,* and *Xiphopenaeus*, for example.

Among the family Penaeidae, edible shrimps include kuruma shrimp (*Marsupenaeus japonicus*), minami kuruma shrimp (*Melicertus canaliculatus*), black tiger (*Penaeus monodon*), chinese white shrimp (*Penaeus chinensis*), green tiger shrimp (*Penaeus semisulcatus*), western king shrimp (*Penaeus latisulcatus*), indian shrimp (*Fenneropenaeus indicus*), sand shrimp (*Metapenaeus ensis*), middle shrimp (*Metapenaeus intermedius*), *Penaeus occidentalis*, blue shrimp (*Penaeus stylirostris*), red tail shrimp (*Penaeus pencicillatus*), whiteleg shrimp (*Litopenaeus vannamei*), for example; however, they are not limited thereto.

In particular, the whiteleg shrimp (*Litopenaeus vannamei*) that belongs to the genus *Litopenaeus* in the family Penaeidae is one of the aquaculture subjects in the aquaculture system according to an embodiment of the present invention.

Shrimps include nektonic species and non-nektonic species. Since the nektonic species can use a tank three-dimensionally, they are suitable in production under an overcrowded condition. In the aquaculture system according to an embodiment of the present invention, shrimps of both the species are able to grow; however, under the overcrowded condition, there may be more opportunities for the shrimps to contact each other, which improves the aquaculture productivity. Accordingly, the nektonic species is preferred as compared with the non-nektonic species. Examples of the nektonic species include kuruma shrimp (*Marsupenaeus japonicus*), black tiger (*Penaeus monodon*), botan shrimp (*Pandalus nipponensis*), Higoromo shrimp (*Pandalopsis coccinata*), sakura shrimp (*Lucensosergia lucens*), pacific pink shrimp (*Pandalus eous*), chinese white shrimp (*Penaeus chinensis*), sand shrimp (*Metapenaeus ensis*), and whiteleg shrimp (*Litopenaeus vannamei*).

A shrimp, not having a nature of burying itself in sand, that hardly bury itself in sand is preferred because it can be reared at a particularly high density in the aquaculture system 100 according to an embodiment of the present invention. Shrimps not having a nature of burying itself in sand include whiteleg shrimp (*Litopenaeus vannamei*) and chinese white shrimp.

Note that the aquaculture system 100 having been described based on FIGS. 1 to 8 illustrates merely an example of the present invention, and the aquaculture system according to the present invention is not limited to the above-described aquaculture system 100.

The present application addresses the following. The "aquaculture equipment for aquatic products" described in Patent Literature 1 is suitable for culturing aquatic products in an environment similar to a natural state by circulating the aquaculture water all the time, but it is difficult to meet a request for stably culturing macrurans, particularly whiteleg shrimps at low costs because the stated equipment requires a considerable workload to manage the temperature of the aquaculture tank.

Furthermore, since the inner wall surface of the tank constituting the "aquaculture equipment for aquatic products" extends in a vertical direction (90 degrees relative to the water surface), it is difficult to collect the shrimps that have been sufficiently reared and ready to be gathered, collect sediment, and the like.

An aspect of the present invention is to provide an aquaculture system able to reduce a workload required for temperature management and suitable for the aquaculture of macrurans.

The configuration of an aquaculture system according to embodiments of the present invention is given as described in (1) to (19) below.

(1) An aquaculture system is a system that includes an aquaculture tank configured to contain aquaculture water for culturing aquatic organisms, and a thermal insulation house constructed to cover the aquaculture tank. Further, the aquaculture system includes a heat insulation unit disposed on at least part of a region surrounding the aquaculture tank, and a temperature adjustment unit for the aquaculture water in the aquaculture tank.

(2) In the aquaculture system according to the description (1), the aquaculture tank has an endless stream passage in which at least part of the aquaculture water is able to circulate while flowing in a horizontal direction.

(3) In the aquaculture system according to the description (1) or (2), at least part of a submerged portion of an inner wall surface of the aquaculture tank is inclined to form a descending slope toward a bottom surface of the aquaculture tank.

(4) In the aquaculture system according to any one of the descriptions (1) to (3), a partition wall is vertically provided in the aquaculture tank in a region which is distanced from the inner wall surface of the aquaculture tank toward an inner side of the aquaculture tank, and in which end portions in the horizontal direction of the partition wall are positioned, so that the endless stream passage is formed around the partition wall.

(5) In the aquaculture system according to the description (3) or (4), an inclination angle of the inner wall surface of the aquaculture tank is 40 degrees to 70 degrees with respect to a horizontal plane.

(6) In the aquaculture system according to any one of the descriptions (1) to (5), the aquaculture tank is installed on land.

(7) In the aquaculture system according to the description (6), the aquaculture tank is formed at least with a recessed portion formed downward from the ground in the gravitational direction, and a synthetic resin sheet having a water-shielding property that is laid on an inner wall surface and a bottom surface of the recessed portion.

(8) In the aquaculture system according to any one of the descriptions (1) to (7), a height of a top portion of the thermal insulation house is 2 m to 3 m.

(9) In the aquaculture system according to any one of the descriptions (1) to (7), a heat insulation material is disposed at least on an upper surface region of the aquaculture tank.

(10) In the aquaculture system according to any one of the descriptions (1) to (9), the aquaculture tank is provided with at least one of an aeration device, an air injector, a paddlewheel, and a feeder.

(11) In the aquaculture system according to the description (10), an attachment posture of a rotation blade of the paddlewheel is changeable by turning over the rotation blade, or rotational directions of the paddlewheel are switchable.

(12) In the aquaculture system according to any one of the descriptions (1) to (11), internal humidity of the thermal insulation house is from 80% to 100%.

(13) In the aquaculture system according to any one of descriptions (1) to (12), the aquatic organisms reared in the aquaculture tank are marine organisms.

(14) In the aquaculture system according to the description (13), the marine organisms are crustaceans.

(15) In the aquaculture system according to the description (14), the crustaceans are the order Decapoda.

(16) In the aquaculture system according to the description (15), the order Decapoda is the superfamily Penaeoidea.

(17) In the aquaculture system according to the description (16), the superfamily Penaeoidea is the family Penaeidae.

(18) In the aquaculture system according to the description (17), the family Penaeidae is the genus *Litopenaeus*.

(19) In the aquaculture system according to the description (18), the genus *Litopenaeus* is a whiteleg shrimp (*Litopenaeus vannamei*).

The embodiments of the present invention can reduce the workload for temperature management, and provide an aquaculture system suitable for culturing macrurans.

INDUSTRIAL APPLICABILITY

The embodiments of the present invention may be widely used in industrial fields such as the fish culturing, the aquaculture marine products industry, and the like as an aquaculture system for rearing macrurans on land.

REFERENCE SIGNS LIST

10 Thermal insulation house
10a Front surface portion
10b Rear surface portion
10c Top portion
11 Building
12 Synthetic resin film member
13 Doorway
14 Sliding door
15 Ventilation fan
16 Ventilation opening
20 Automatic feeder
30 Boiler
40 Heat insulation material
41, 42 Receiving beam
50 Aquaculture tank
51, 52 Inner wall surface
53 Bottom surface
54 Partition wall
54a, 54b End portion
55 Endless stream passage
60 Air injector
70 Paddlewheel
71 Rotation blade
72 Motor
80 Aeration device
90 Settling tank
91 Circulation pump
100 Aquaculture system
G Ground
H horizontal plane
R Inclination angle
S Water flow
W Aquaculture water Obviously, numerous modifications and variations of the present invention are possible in light of the above teachings. It is therefore to be understood that within the scope of the appended claims, the invention may be practiced otherwise than as specifically described herein.

What is claimed is:

1. An aquaculture system, comprising:
an aquaculture tank configured to hold aquaculture water for culturing an aquatic organism; a thermal insulation house configured to cover the aquaculture tank;
an insulation positioned on at least part of a region surrounding the aquaculture tank; and a temperature adjuster configured to adjust a temperature inside the thermal insulation house and/or a temperature of the aquaculture water in the aquaculture tank, wherein the insulation comprises a heat insulation material positioned at least on an upper surface region of the aquaculture tank; wherein the aquaculture tank has a endless stream passage that allows at least part of the aquaculture water to circulate while flowing in a horizontal direction; and wherein the aquaculture tank has a parition wall vertically placed therein, and the partition wall is positioned such that an end portion of the partition wall in the horizontal direction is distanced from the inner wall surface of the aquaculture tank toward an inner side of the aquaculture tank, and that the endless stream passage is formed around the partition wall.

2. The aquaculture system according to claim 1, wherein the thermal insulation house has a height of 2 m to 3 m from the ground to a top portion thereof.

3. The aquaculture system according to claim 1, wherein the aquaculture tank includes at least one of an aeration device, an air injector, a paddlewheel, and a feeder.

4. The aquaculture system according to claim 3, wherein the aquaculture tank includes a paddlewheel having a rotation blade, and
an attachment posture of the rotation blade is changeable by turning over the rotation blade, or rotational directions of the paddlewheel are switchable.

5. The aquaculture system according to claim 1, wherein the thermal insulation house has internal humidity of from 80% to 100%.

6. The aquaculture system according to claim 1, wherein the insulation comprises at least one foamed synthetic resin.

7. The aquaculture system according to claim 1, wherein the temperature adjuster comprises a boiler.

8. The aquaculture system according to claim 7, wherein the temperature adjuster further comprises a ventilation fan.

9. A method of culturing an aquatic organism, comprising:
rearing the aquatic organism in the aquaculture system of claim 1,
wherein the aquatic organism is a marine organism.

10. The method according to claim 9, wherein the marine organism is a crustacean.

11. The method according to claim 10, wherein the crustacean is the order Decapoda.

12. The method according to claim 11, wherein the order Decapoda is the superfamily Penaeoidea.

13. The method according to claim 12, wherein the superfamily Penaeoidea is the family Penaeidae.

14. The method according to claim 13, wherein the family Penaeidae is the genus *Litopenaeus*.

15. The method according to claim 14, wherein the genus *Litopenaeus* is a whiteleg shrimp (*Litopenaeus vannamei*).

16. An aquaculture system comprising: an aquaculture tank configured to hold aquaculture water for culturing an aquatic organism; a thermal insulation house configured to cover the aquaculture tank; an insulation positioned on at least part of a region surrounding the aquaculture tank; and a temperature adjuster configured to adjust a temperature inside the thermal insulation house and/or a temperature of the aquaculture water in the aquaculture tank, wherein the aquaculture tank has an inner wall surface, and at least part of a submerged portion of the inner wall surface is inclined to form a descending slope toward a bottom surface of the aquaculture tank; wherein the inner wall surface of the aquaculture tank has an inclination angle of 40 degrees to 70 degrees with respect to a horizontal plane.

17. A method of culturing an aquatic organism, comprising:
rearing the aquatic organism in the aquaculture system of claim 16,
wherein the aquatic organism is a marine organism.

18. An aquaculture system comprising:
an aquaculture tank configured to hold aquaculture water for culturing an aquatic organism;
a thermal insulation house configured to cover the aquaculture tank;
an insulation positioned on at least part of a region surrounding the aquaculture tank; and
a temperature adjuster configured to adjust a temperature inside the thermal insulation house and/or a temperature of the aquaculture water in the aquaculture tank,
wherein the aquaculture tank is configured such that the aquaculture tank is installed on land, the aquaculture tank includes a recessed portion formed downward from ground in a gravitational direction, and a synthetic resin sheet which has a water-shielding property and is laid on an inner wall surface and a bottom surface of the recessed portion.

19. A method of culturing an aquatic organism, comprising:
rearing the aquatic organism in the aquaculture system of claim 18,
wherein the aquatic organism is a marine organism.

20. An aquaculture system comprising: an aquaculture tank configured to hold aquaculture water for culturing an aquatic organism; a thermal insulation house configured to cover the aquaculture tank; an insulation positioned on at least part of a region surrounding the aquaculture tank; and a temperature adjuster configured to adjust a temperature inside the thermal insulation house and/or a temperature of the aquaculture water in the aquaculture tank, wherein the insulation comprises at least one insulation plate, wherein the aquaculture tank has an endless stream passage that allows at least part of the aquaculture water to circulate while flowing in a horizontal direction; and wherein the aquaculture tank has a partition wall vertically placed therein, and the partition wall is positioned such that an end portion of the partition wall in the horizontal direction is distanced from the inner wall surface of the aquaculture tank toward an inner side of the aquaculture tank, and that the endless stream passage is formed around the partition wall.

21. A method of culturing an aquatic organism, comprising:
rearing the aquatic organism in the aquaculture system of claim 20,
wherein the aquatic organism is a marine organism.

* * * * *